United States Patent [19]

Mattes et al.

[11] Patent Number: 4,614,876

[45] Date of Patent: Sep. 30, 1986

[54] VEHICLE PASSENGER RESTRAINT SYSTEM

[75] Inventors: Bernhard Mattes, Sachsenheim, Fed. Rep. of Germany; Eberhard Mausner, Linz, Austria; Wadym Suchowerskyj, Leonberg, Fed. Rep. of Germany

[73] Assignee: Robert Bosch GmbH, Stuttgart, Fed. Rep. of Germany

[21] Appl. No.: 631,933

[22] Filed: Jul. 18, 1984

[30] Foreign Application Priority Data

Jul. 21, 1983 [DE] Fed. Rep. of Germany ....... 3326277

[51] Int. Cl.$^4$ .............................................. B60R 21/10
[52] U.S. Cl. ............................. 307/10 SB; 307/10 R; 340/52 E; 340/52 R; 340/52 H; 180/268; 180/282
[58] Field of Search .................... 307/10 R, 9, 10 SB; 340/52 R, 52 E, 52 H, 52 F, 53, 61; 180/268, 271, 274, 282; 280/728, 734, 735, 753, 752, 802, 807; 324/76 R, 133, 158 R

[56] References Cited

U.S. PATENT DOCUMENTS

| | | | |
|---|---|---|---|
| 3,359,539 | 12/1967 | Fink | 340/52 R X |
| 3,806,867 | 4/1974 | Quantz | 340/52 E |
| 3,874,695 | 4/1975 | Abe et al. | 280/735 |
| 3,904,884 | 9/1975 | Uota | 307/10 SB |
| 3,912,939 | 10/1975 | Quantz et al. | 340/52 E X |
| 3,916,376 | 10/1975 | Tuttle | 340/52 H |
| 3,935,919 | 2/1976 | Kawamura et al. | 180/268 X |
| 4,101,869 | 7/1978 | Henderson | 340/52 R |
| 4,176,340 | 11/1979 | Steinmeier | 180/282 X |
| 4,220,871 | 9/1980 | Yasui et al. | 180/274 X |
| 4,222,030 | 9/1980 | Yasui et al. | 180/274 X |
| 4,243,971 | 1/1981 | Suchowerskyj et al. | 340/52 H |
| 4,287,431 | 9/1981 | Yasui et al. | 180/274 X |
| 4,344,502 | 8/1982 | Terabayashi | 307/10 SB X |
| 4,381,829 | 5/1983 | Montaron | 180/282 X |
| 4,410,061 | 10/1983 | Terabayashi | 307/10 SB X |
| 4,546,266 | 10/1985 | Zenick et al. | 180/287 X |

FOREIGN PATENT DOCUMENTS 0011680 6/1980 European Pat. Off. .
0022146 9/1982 European Pat. Off. .

OTHER PUBLICATIONS

ATZ Autobiltechnisch Zentschrift ("Journal for Automotive Technology"), vol. 2, 1982, pp. 77–83.

Primary Examiner—William M. Shoop, Jr.
Assistant Examiner—Shik Luen Paul Ip
Attorney, Agent, or Firm—Frishauf, Holtz, Goodman & Woodward

[57] ABSTRACT

To reduce the number of connecting lines to the triggering circuit, the number of current lead-in terminals (20, 21) multiplied by the number of lead-off or return terminals (22, 23) from the firing circuits corresponds at least to the number of trigger restraint circuits (14–17) which are provided; and each of the trigger circuits (14–17) is connected to a different combination of current lead-in terminals (20, 21) and current lead-off terminals (22, 23), for example: 14: 21, 22; 15: 21, 23; 16: 20, 22; 17: 20, 23. The firing circuits can be tested by a simple test unit (FIG. 2) in which, sequentially, different connection patterns to the current lead-in and lead-off terminals are provided, and current flow checked under standard test voltage conditions.

8 Claims, 2 Drawing Figures

VEHICLE PASSENGER RESTRAINT SYSTEM

Reference to related application, assigned to the assignee of the present invention, the disclosure of which is hereby incorporated by reference:

U.S. Ser. No. 632,379, filed July 19, 1984, GADEMANN et al (corresponding to German Appln. P 33 28 114.9 of Aug. 4, 1983).

Literature: "ATZ Autobiltechnische Zeitschrift" 84 ("Journal for Automotive Technology"), Vol. 2, 1982, pp. 77 to 83.

The present invention relates to a trigger arrangement, and more particularly to a trigger circuit which readily permits testing thereof, used in connection with passenger restraint systems, such as seatbelt locks, or airbags.

BACKGROUND

Various types of triggering systems for seatbelt locks, airbags, and the like, have been proposed; one such construction is described in the referenced literature. In such systems, typically, an acceleration sensor—or, more accurately, a deceleration sensor—determines deceleration of the vehicle and provides a deceleration output signal to an evaluation or control circuit if the vehicle deleration corresponds to an impact on an obstruction which may be another vehicle. The triggering system electrically triggers an ignition which, by chemical reaction, or explosion, causes sudden inflation of an airbag, or immediate tightening of a seatbelt or seatbelt system, such as a combination lap-shoulder belt, or the like.

The system, thus, uses two distinct and discrete elements: the electrical sensing system and, then, a chemical or other triggering system since, after the initial sensing which is carried out with electronic speed, electrical power may no longer be available due to destruction of the electrical system or interruption of electrical circuitry.

If various passengers are present in the vehicle, or if the vehicle, in general, is equipped for several passengers, particularly for at least four passengers, individual triggering circuits for the seatbelts or airbags—in general, passenger restraint units—may be provided. Since the life of the passengers may well depend on the operability of the overall system, it is necessary to test the various components at suitable intervals, for example each time an oil change or other maintenance of the vehicle is carried out. Testing of the control system themselves is known—see, for example, Published European Patent Application EP-A 11 680, or EP-B 22 146; the checking and testing of the control or evaluation unit, itself, does not form the subject matter of the present invention. Rather, the present invention is directed to testing of the triggering or ignition circuits which cause explosion or other chemical reaction of the restraint unit itself.

In accordance with customary use, a common return line is used for the trigger elements of each of the separate, for example, four, restraint units. This, then, requires, for safety and functionality, five connecting lines: four for the four triggering circuits, and one return line. It is, then, necessary to additionally provide control units with five circuit connectors in order to test the respective ignition trigger circuits after installation. In customary commercial plug pins, it is only possible to connect, at the most, two connecting lines at a time. The number of connecting lines, thus, is quickly multiplied, and will increase to six.

THE INVENTION

It is an object to decrease the number of connecting lines, and this the number of plug connections which may be available for testing, or which have to be tested, and which additionally permit separate testing of individual trigger unit circuits.

Briefly, each one of the trigger units has a current lead-in connecting line or terminal, and a current lead-off or return connecting line or terminal. In accordance with the invention, the number of current lead-in terminals, multiplied by the number of lead-off terminals, corresponds to at least the number of the restraint trigger circuits; thus, for example, if two lead-in terminals and two lead-off terminals are provided, four passenger restraint trigger system units can be connected. The trigger circuits are connected to different combinations of current lead-in terminals and current lead-off terminals. For example, the trigger units for the front seat can be connected to a first current lead-in terminal and to two different current lead-off or return terminals; and the units for rear seats to the other current lead-in terminal and the respective current lead-off or return terminals. Thus, each current lead-in and current lead-off or return terminal is connected to two trigger circuits of the trigger units, but in different combinations.

The arrangement has the advantage that with four trigger circuits, for example, a connecting line is provided in any instance permitting testing by standardized plug pins, and it is even possible to save two connecting lines. As the number of trigger circuits increases, for example for larger vehicles, the savings become material and proportionately greater. In accordance with the invention, four trigger circuits or trigger units require four connecting lines. This permits testing by a readily available, inexpensive standardized plug unit having, for example, four connecting terminals, permitting easy checking of the triggering circuits of the respective restraint units. A six-passenger vehicle will thus require only five wires, for example three current lead-in terminals and two current lead-off terminals ($3 \times 2 = 6$).

In accordance with a preferred embodiment of the invention, a plug unit is used for all connections to the trigger circuits or restraint units which is so arranged that mere re-plugging of the unit can easily permit testing of the respective trigger circuits of the restraint units. A simple test apparatus with a transfer switch can then sequentially test the resistances of the respective electrochemical trigger elements of the respective trigger circuits, forming firing circuits for the respective electrochemical pellets of the restraint units, to thereby test continuity and operability by current flow through the respective triggering circuits, that is, the firing circuits of the restraint units.

DRAWINGS:

FIG. 1 is a schematic circuit diagram of the wiring arrangement of the passenger restraint system; and FIG. 2 is a schematic circuit diagram illustrating a test unit for use with the system of FIG. 1.

DETAILED DESCRIPTION

Figure 1:
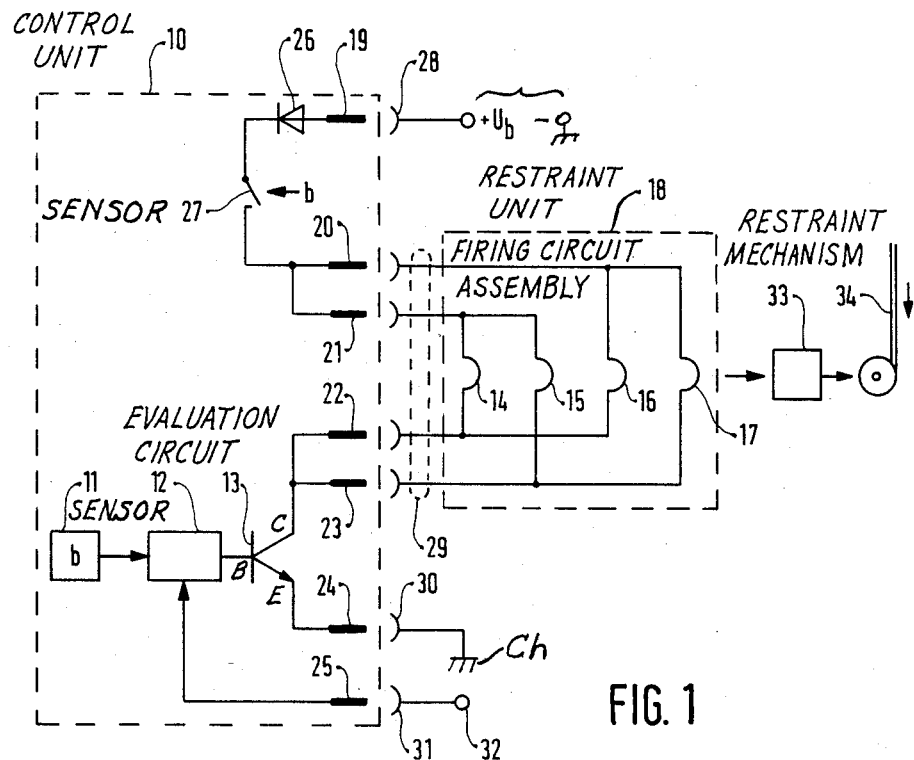

The broken line 10 of FIG. 1 illustrates the portion of the system which, for example, is located in the vehicle ahead of the firewall thereof. It includes the overall control system 10 which has an acceleration or, rather, deceleration sensor 11, providing an output signal to an evaluation circuit 12, for example an amplifier, of well-known and standard construction—see, for example, the referenced literature for a suitable example. Upon response of the sensor 11 to deceleration b, corresponding, for example, to a collision, and consequent response of the evaluation circuit 12—as is well known in the prior art, and for example as described in the literature—switching transistor 13 is controlled to conduction so that triggering current can flow through four firing circuits in the restraint unit assembly 18. The control unit 10 has an output with seven plug connections 19-25, designed, for example, for a standard 8-terminal plug. Such a unit is desirable for symmetry and standardization. One of the terminals of the 8-terminal plug is open or free. The terminal 24 is connected to the emitter of the transistor 13, terminal 23 to the collector of the transistor 13, terminal 25 to a test input for the evaluation circuit 12. This test input for the evaluation circuit can be used, in accordance with well-known testing of evaluation circuit 12, and does not form part of the present invention. It is shown in the drawings for completeness.

Terminal 19 is connected through a reverse-polarity protection diode 26 to a second deceleration sensor 27 which, in turn, is connected to two parallel connected output terminals 20, 21 of the plug unit. The terminals 22, 23, both connected to the collector of transistor 13, likewise are connected in parallel. The socket portion of the plug unit, for example, or the plug portion, if terminals 19-25 form the socket, is connected to the positive terminal $U_b$ of a power source, for example to the battery, or to a positive power supply bus. It is connected to the terminal 28 of the plug or socket unit as the case may be. A 4-terminal plug or socket, as the case may be, and shown schematically by broken lines 29, is connected to terminals 20-23. A pin connection 30 connects terminal 24 to chassis or ground, schematically marked as Ch; a pin connection 31 can be connected to terminal 25 to provide a test input terminal 32, if required.

The 4-terminal standard plug 29 connects the respective terminals 20-23 of the system as follows:

triggering or firing circuit 14 is connected between plugs 21, 22;

firing circuit 15 is connected between plugs 21 and 23;

firing circuit 16 is connected between plugs 22 and 20;

and firing circuit 17 is connected between plugs 23 and 20.

Of course, a common 8-terminal plug can be substituted for the element 29, if desired, with the terminals 28 30, 31 connected as shown in FIG. 1.

The deceleration sensor 27 may, for example, be a mercury switch.

Upon collision of the vehicle with an obstruction, the transistor 13 becomes conductive due to response of the evaluation circuit 12, and closing of switch 27. Due to deceleration, and closing of the switch 27, current will flow from the power source $U_b$ through plug 28 to the firing circuit assembly 18, and then through the transistor 13 and connection 30 to ground or chassis. In accordance with the state of technology, the firing circuits 14 to 17 will trigger respective restraint mechanisms 33 which, for example, cause locking or tightening of passenger restraint belts 34. Only one such system 33-34 is shown for simplicity, it being understood that each one such system is provided with each firing circuit. The system 33 may, for example, contain explosive pellets to trigger inflation of an airbag or locking of a belt mechanism. The belt mechanism and the airbag may be used together, or in the alternate; airbags are not shown in the drawings for simplicity.

Testing of the evaluation circuit 12 can be carried out, in accordance with the well-known technology, by connecting a suitable test instrument to terminal 32 through plugs 31-25. To test the trigger or firing device 18, however, it is necessary to disconnect the plug or socket unit 29 and test the individual circuits. To do so, the control unit 10 is removed and, instead, a test unit 40—FIG. 2—is inserted in the sockets 29 of unit 18.

Figure 2:
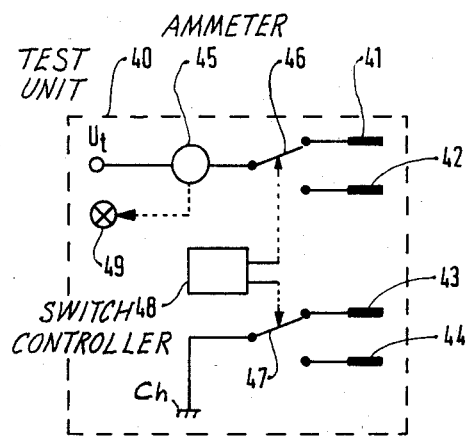

The testing unit 40 of FIG. 2 has four plugs 41-44, located and dimensioned to receive the sockets or terminals of element 29. The test unit 40 provides a test voltage $U_t$ through an ammeter 45 to a transfer switch 46, controlled by a switch controller 48. Transfer switch 46 alternately connects the source of voltage $U_t$ to one of the terminals 41, 42. Another transfer switch 47, operable independently of transfer switch 46, is connectable to the terminals 43, 44, respectively, switch 47 being connected to ground or chassis. The switches 46, 47 are both operated by the control unit 48, which can be sequenced manually or automatically.

Operation: Let it be assumed that the terminals 41-44 are connected to the socket unit 29. A test sequence, for example by an automatic program, applied to the control unit 48, is then started as follows: First, the two transfer switches 46, 47 are placed, for example, in the position shown. This will test firing circuit 16. Thereafter, the switches 46, 47 are operated, independently, one after the other, to transfer the test to other combinations. For example, upon change-over of switch 46, leaving switch 47 alone, firing circuit 14 will be tested. Then, changing over switch 47 will test firing circuit 15; and then returning switch 46 to the position shown, but leaving switch 47 in the position not shown in FIG. 2, will test firing circuit 17. Thus, upon each combination of switch setting, one only of the firing circuits 14-17 will have current flowing therethrough. The ammeter, or other current measuring device 45 records this current and compares the current with a design or command current, considering the value of the test voltage $U_t$ applied. This test voltage, of course, should be far below that which causes current flow which might fire the pellets in the restraint units. In its simplest manner, the current flow, given a standard test voltage $U_t$, is indicated by an ammeter; other arrangements may be used, for example current sensors may be applied instead of the ammeter 45 which check for maximum or minimum current, within upper and lower limits, to determine if the current with a standardized voltage $U_t$ is within two thresholds; if this is not the case, a "malfunction" control lamp 49 can be triggered. This, the resistances and continuities as well as short circuits within the respective firing circuits 14-17 can be reliably indicated.

The system permits replacement of the plug connection formed by terminals 20-23 and the socket 29 by a simple standard 4-terminal connector 29; the terminals of the 4-terminal connector are then sequentially controlled and tested in accordance with the simple test apparatus 40.

In accordance with a feature of the invention, two current lead-in terminals, namely terminals 20, 21, and two current lead-off or return terminals 22, 23 are required. For a larger number of firing circuits, the number of the required terminals is increased. The increase is not linear, but rather in accordance with the mathematical relationship: the number of terminals for current lead-in or current supply multiplied with the number of terminals for current lead-off or return corresponds at least to the number of ignition or firing circuits. For example: Two current supply terminals and three current lead-off or return terminals or three current supply terminals and two current lead-off or return terminals are available to trigger, respectively, either five or six firing restraint circuits. Three current supply and three current return terminals are available for from seven to nine firing circuits, for example for a passenger-equipped van. This, then, requires only six terminals to be tested and checked, and a 6-terminal plug; in accordance with customary and simple switching, nine trigger or firing circuits would have required ten connecting lines, and hence ten terminals. Additionally, the wiring is greatly simplified since the respective connections can all be made at the connecting plug or socket, respectively, shown by broken line 29, and then connecting merely a two-wire line to the respective restraint unit at its location in the vehicle.

Various changes and modifications may be made within the scope of the inventive concept.

We claim:

1. A vehicle passenger restraint system having: a plurality of electrically actuated restraint mechanisms (33, 34);

an electrical deceleration switch (11) sensing deceleration of a vehicle and providing an output signal upon sensing (12) deceleration representative of a collision or imminence of a collision;

a source ($U_b$) of electrical power;

electrical switch means (13), connected to and controlled by (B) the output signal, and closing an electrical circuit including respective individual restraint trigger firing circuits (14–17), each controlling operation of a respective restraint mechanism (33, 34), each restraint trigger firing circuit having a current lead-in terminal (20, 21) connected to the source of power ($U_b$) and a current lead-off or return terminal (22, 23) connected to a first connection terminal (C) of the switch means (13), and then through a second connection terminal (E) of the switch means (13) to a return terminal (24, 30, Ch) of the source of power, wherein, to facilitate testing of said restraint trigger firing circuits with a minimal number of test apparatus terminals, the number of current lead-in terminals multiplied by the number of current lead-off or return terminals corresponds at least to the number of restraint trigger firing circuits (14–17); and wherein each restraint trigger firing circuit (14–17) is connected to a different selected pair of a current lead-in terminal (20, 21) and a current lead-off or return terminal (14: 21, 22; 15: 21, 23; 16: 20, 22; 17: 20, 23).

2. System according to claim 1, wherein the current lead-in terminals (20, 21) and the current lead-off or return terminals (22, 23) are part of a plug-socket connection (29).

3. System according to claim 1, in combination with
    a test unit (40), said test unit being connectable to the restraint trigger firing circuits (14–17) and having a source of test voltage ($U_t$), and first (41, 42) and second (43, 44) groups of output terminals connectable respectively to the current lead-in and to the current lead-off or return terminals of said restraint trigger firing circuits; and selectively operable first (46) and second (47) transfer switch means respectively connecting each of said first (41, 42) and second (43, 44) groups of output terminals of the test unit (40) to a different respective terminal ($U_t$, Ch) of the test voltage source.

4. System according to claim 3, further including a current sensing element (45) connectable in circuit between one of the terminals ($U_t$) of the test voltage and the respective terminals connectable with the restraint trigger firing circuit current terminals (20–23).

5. System according to claim 1, wherein, for four individual restraint units, two current lead-in terminals (20, 21) and two current lead-off or return terminals (22, 23) are provided.

6. System according to claim 3, wherein the current lead-in terminals (20, 21) and the current lead-off or return terminals (22, 23) are part of a plug-socket connection (29).

7. System according to claim 4, wherein the current lead-in terminals (20, 21) and the current lead-off or return terminals (22, 23) are part of a plug-socket connection (29).

8. System according to claim 5, wherein the current lead-in terminals (20, 21) and the current lead-off or return terminals (22, 23) are part of a plug-socket connection (29).

* * * * *